(12) United States Patent
Lu et al.

(10) Patent No.: US 8,355,188 B2
(45) Date of Patent: Jan. 15, 2013

(54) DOCUMENT GUIDING MECHANISM

(75) Inventors: Pei-Chun Lu, Taipei (TW); Yung-Kai Chen, Taipei (TW)

(73) Assignee: Foxlink Image Technology Co., Ltd., Taipei (TW)

( * ) Notice: Subject to any disclaimer, the term of this patent is extended or adjusted under 35 U.S.C. 154(b) by 337 days.

(21) Appl. No.: 12/844,265

(22) Filed: Jul. 27, 2010

(65) Prior Publication Data

US 2012/0026561 A1 Feb. 2, 2012

(51) Int. Cl.
*H04N 1/04* (2006.01)
(52) U.S. Cl. ......... 358/498; 358/474; 358/497; 358/496
(58) Field of Classification Search .................. 358/498, 358/474, 497, 496
See application file for complete search history.

(56) References Cited

U.S. PATENT DOCUMENTS

| | | | | |
|---|---|---|---|---|
| 2002/0067944 A1* | 6/2002 | Lee et al. | ....................... | 400/624 |
| 2005/0140083 A1* | 6/2005 | Koga et al. | ...................... | 271/121 |
| 2007/0138728 A1* | 6/2007 | Terao et al. | ................. | 270/58.09 |

* cited by examiner

*Primary Examiner* — Houshang Safaipour
(74) *Attorney, Agent, or Firm* — WPAT, P.C.; Anthony King

(57) ABSTRACT

A document guiding mechanism includes a document supporting tray, a gearwheel coupled to the document supporting tray, a right guiding unit, a left guiding unit and a single-way latch means. The right guiding unit includes a right guiding wall positioned on the document supporting tray and a right linear gear extended from the right guiding wall and engaged with the gearwheel. The left guiding unit includes a left guiding wall positioned on the document supporting tray and opposite to and parallel to the right guiding wall, and a left linear gear extended from the left guiding wall and engaged with the gearwheel. The single-way latch means interconnects the document supporting tray and at least one of the right guiding unit and the left guiding unit. The right guiding wall and the left guiding wall can be kept at a suitable position by the single-way latch means.

10 Claims, 4 Drawing Sheets

DOCUMENT GUIDING MECHANISM

BACKGROUND OF THE INVENTION

1. Field of the Invention

The present invention relates to a document guiding mechanism, more specifically, to a document guiding mechanism with high reliability.

2. The Related Art

A conventional document guiding mechanism used in a printer, a scanner, a copy apparatus, a multi-function official apparatus and the like includes a document supporting tray and a document guiding means configured to the document supporting tray. The document guiding means includes a gear substantially positioned at a central portion of the document supporting tray, a right guiding unit laterally sliding on the document supporting tray and a left guiding unit laterally sliding on the document supporting tray.

The right guiding unit and the left guiding unit synchronously slides on the document supporting tray toward opposite directions. The left guiding unit includes a left guiding wall vertically positioned on the document supporting tray and a left linear gear extended from the left guiding wall and engaged with the gear. The right guiding unit includes a right guiding wall vertically positioned on the document supporting tray and a right linear gear extended from the right guiding wall and engaged with the gear.

The right guiding wall and the left guiding wall can be manually slid laterally to adjust a distance therebetween for adapting to various documents. The documents can be kept straightly to be conveyed in the printed, the scanner, the copy apparatus and the multi-function official apparatus. Since, the right guiding wall and the left guiding wall together can prevent document from de-skew.

The right guiding wall and the left guiding wall synchronously slide on the document supporting tray toward opposite directions via the rotation of the gear synchronously brining linearly movement of the lift linear gear and the right linear gear. The left guiding wall and the left guiding wall can be kept at a suitable position by a friction consisted of the engagement between the gear and the left linear gear and the engagement between the gear and the right linear gear.

However, the right guiding wall and the left guiding wall are easy out of the suitable position by shaking and crashing Since, the left guiding wall and the right guiding wall can not guide the document in straight.

SUMMARY OF THE INVENTION

An object of the present invention is to provide a document guiding mechanism has high reliability.

According to the invention, the document guiding mechanism includes a document supporting tray, a gearwheel, a right guiding unit, a left guiding unit and a single-way latch means. The gearwheel couples to the document supporting tray.

The right guiding unit includes a right guiding wall positioned on the document supporting tray and a right linear gear extended from the right guiding wall and engaged with the gearwheel. The left guiding unit includes a left guiding wall positioned on the document supporting tray and opposite to and parallel to the right guiding wall, and a left linear gear extended from the left guiding wall and engaged with the gearwheel. The single-way latch means interconnects the document supporting tray and at least one of the right guiding unit and the left guiding unit.

Another object of the present invention is to provide a stable document guiding mechanism.

According to the invention, the document guiding mechanism includes the document supporting tray, the right guiding unit, the left guiding unit and the single-way latch means. The right guiding unit slides on the document supporting tray. The left guiding unit slides on the document supporting tray. The left guiding unit and the right guiding unit synchronously slide to close to each other and synchronously slide to far from each other The single-way latch means interconnects the document supporting tray and at least one of the right guiding unit and the left guiding unit for allowing the left guiding unit and the right guiding unit synchronously sliding to close to each other and preventing the left guiding unit and the right guiding unit synchronously sliding to far from each other when the single-way latch means latches at lest one of the left guiding unit and the right guiding unit.

The single-way latch means can keep the right guiding wall of the right guiding unit and the left guiding wall of the left guiding unit at a suitable position for preventing the right guiding wall and the left guiding wall from further sliding outwardly. Therefore, the document guiding mechanism has high reliability to resist shake and crash.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENT

Figure 1:
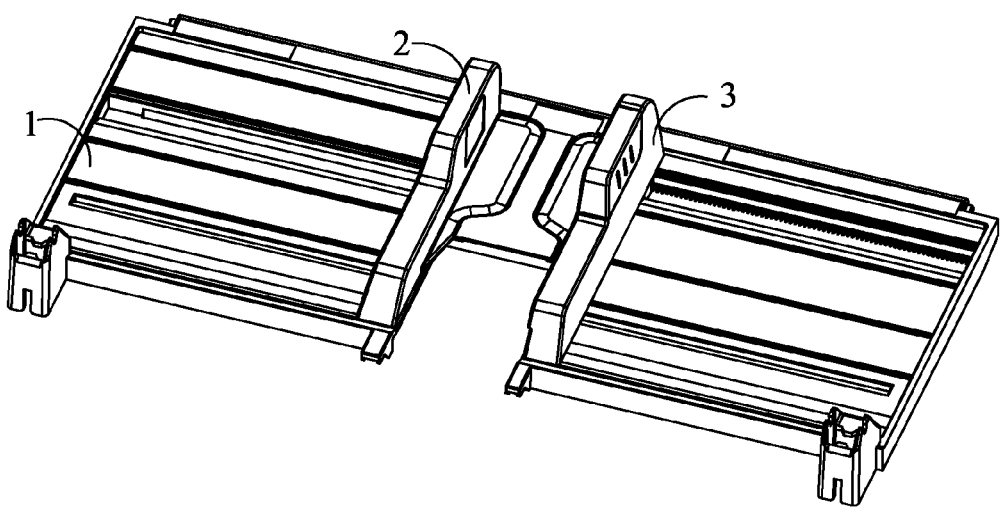
FIG. 1 is a perspective view of a preferred embodiment of a document guiding mechanism according to the present invention.
Figure 2:
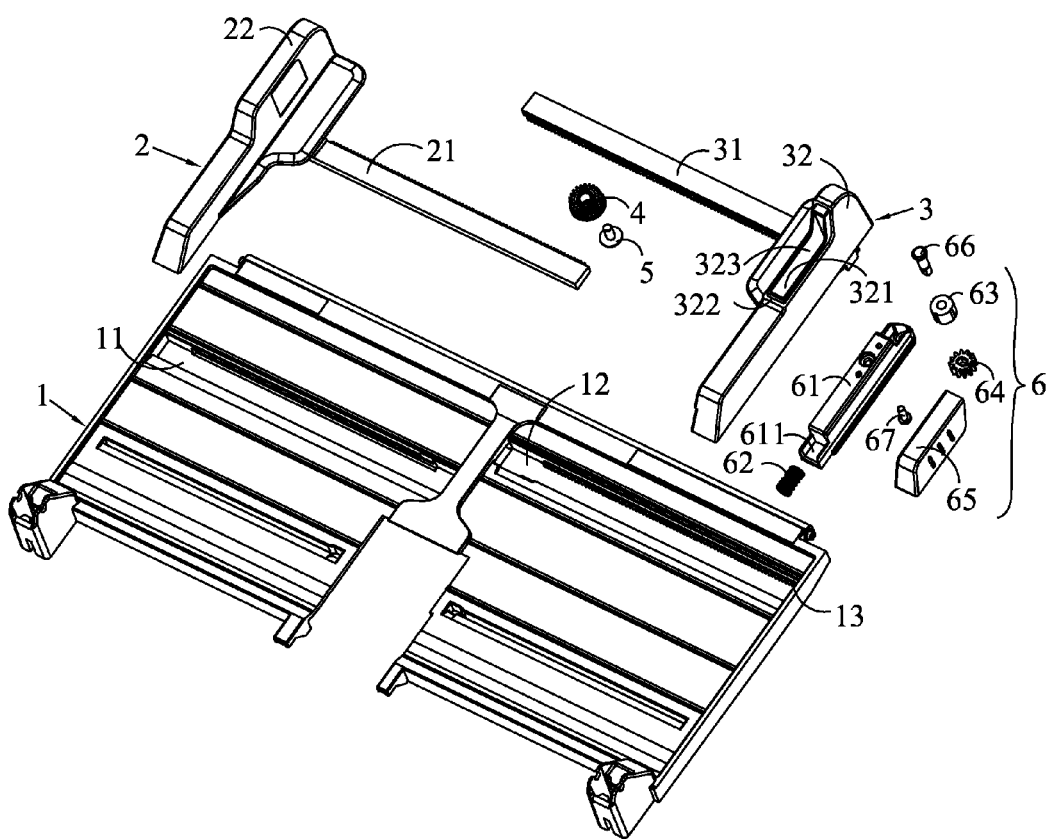
FIG. 2 is an exploded view of the document guiding mechanism according to the present invention.
Figure 3:
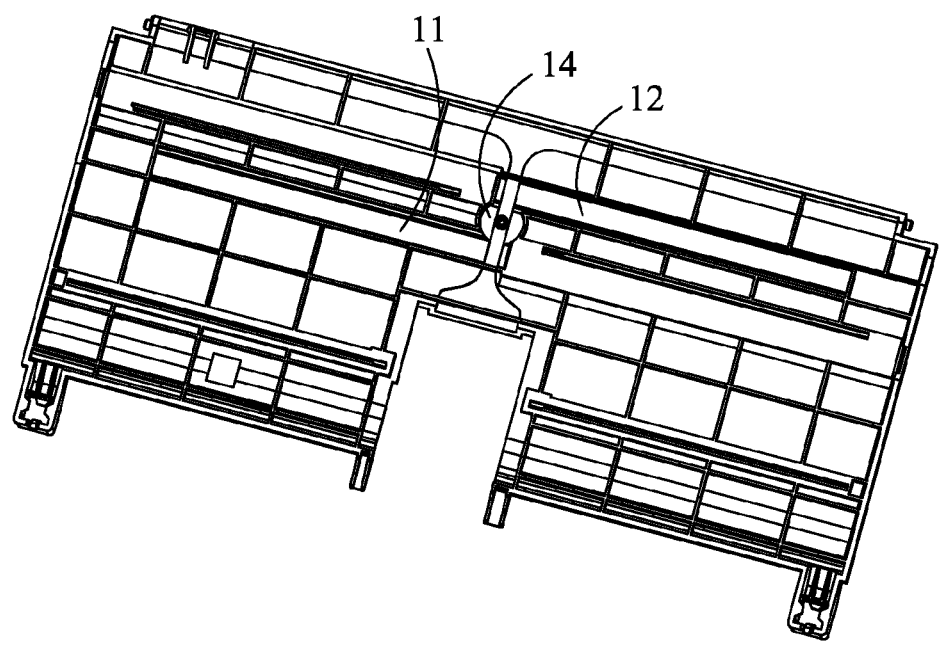
FIG. 3 is a bottom view of the document guiding mechanism according to the present invention.
Figure 4:
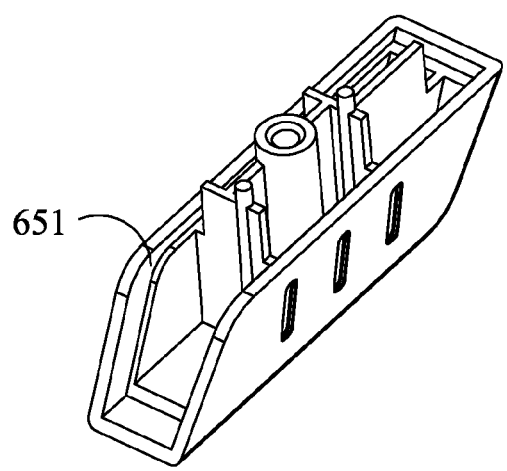
FIG. 4 is a perspective view of an actuating cap of the document guiding mechanism according to the present invention.
Figure 5:
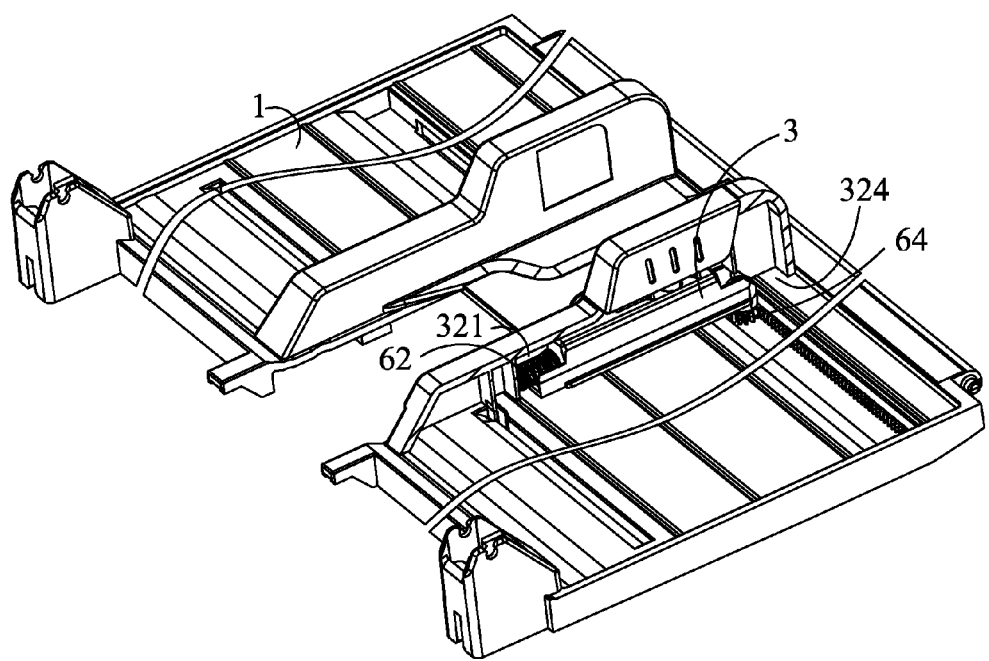
FIG. 5 is a cross section view of the document guiding mechanism according to the present invention.

Please refer to FIG. 1 to FIG. 5. A preferred embodiment of a document guiding mechanism 100 includes a document supporting tray 1, a document guiding means and a single-way latch means 6. The document supporting tray 1 includes a left guiding slot 11 transversely formed at a left portion thereof, a right guiding slot 12 transversely formed at a right portion thereof, a positioning linear gear 13 formed at one side of the right guiding slot 12 and a cavity 14 formed at a rear of a central portion thereof. Especially, the cavity 14 is formed as a circle and between the left guiding slot 11 and the right guiding slot.

The document guiding means is configured to the document supporting tray 1. The document guiding means includes a gearwheel 4, a left guiding unit 2 and a right guiding unit 3. The gearwheel 4 is freely rotated and accommodated in the cavity 14 via a screw 5 interconnecting an axis of the gearwheel and the document supporting tray 1.

The left guiding unit 2 and the right guiding unit 3 are capable of synchronously sliding on the document supporting tray 1 toward opposite direction. The left guiding unit 2 includes a left guiding wall 22 vertically positioned on the left portion of the document supporting tray 1 and a left linear gear 21 vertically extended from the left guiding wall 22 and received in the left guiding slot 11.

The right guiding unit 3 includes a right guiding wall 32 vertically positioned on the right portion of the document supporting tray 1 and a right linear gear 31 vertically extended from the right guiding wall 32 and received in the right guiding slot 12. Especially, the left guiding slot 11 is parallel with the right guiding slot 12. The left guiding wall 22 is parallel with and opposite to the right guiding wall 32. The extended direction of the left guiding wall 21 and the right guiding wall 31 is perpendicular to the extended direction of the left guiding slot 11 and the right guiding slot 12. The left linear gear 21 of the left guiding unit 2 and the right linear gear 31 of the right guiding unit 3 respectively engage with the gearwheel 4.

The right guiding wall 32 includes a receiving space 321 and a track 322. The receiving space defines a top opening 323 formed at a top of the right guiding wall 32 and a bottom opening 324 formed at a bottom of the right guiding wall 32. The track 322 is surrounded the top opening 323.

The single-way latch means 6 interconnects the right guiding wall 31 and the document supporting tray 1. The single-way latch means 6 includes a sliding frame 61 received in the receiving space 321 of the right guiding wall 32, a single-way latch 63 configured to the sliding frame 61, a positioning gear 64 coupled to the single-way latch 63 by a screw 66, a spring 62 compressed between the sliding frame 61 and the right guiding wall 32 along the extended direction of the right guiding wall 32 and an actuating cap 65 mounted on the right guiding wall 32 and covering the top opening 323.

The sliding frame 61 includes a concave portion 611 formed at one end portion thereof for receiving the spring 62. Especially, one end of the spring 62 abuts against the right guiding wall 32 and the other end abuts against one surface of the concave portion 611 of the sliding frame 61. The actuating cap 65 includes a sliding path 651 mated with the track 322 of the right guiding wall 32.

The positioning gear 64 and the single-way latch 63 is positioned at the other end portion of the sliding frame 61. The positioning gear 64 engages with the positioning linear gear 13 of the document supporting tray 1. The actuating cap 65 is fixed to the sliding frame 61 by a screw 67. The actuating cap 65 slides on the right guiding wall 32 by cooperation of the sliding path 651 and the track 322.

If the document guiding mechanism 100 works, the right guiding wall 32 of the right guiding unit 3 will be manually moved to close to the left guiding wall 22 of the left guiding unit 2 and to a suitable position. The right linear gear 31 of the right guiding unit 3 moved along the right guiding slot 12 brings the gearwheel 4 to rotate. The positioning gearwheel 64 rotates along the positioning linear gear 13.

The rotation of the gearwheel 4 brings the left linear gear 21 to linearly move along the left guiding slot 11. Since, the left guiding wall 22 and the right guiding wall 32 are capable of synchronously sliding on the document supporting tray 1 toward each other.

After the right guiding wall 32 of the right guiding unit 3 is moved inwardly at the suitable position, the single-way latch 63 latches the positioning gearwheel 64 for preventing the right guiding wall 32 from sliding outwardly. Since, the right guiding wall 32 of the right guiding unit 3 and the left guiding wall 22 of the left guiding unit 2 can be kept at the suitable position via the single-way latch 63 latching the positioning gearwheel 64.

If the right guiding wall 32 of the right guiding unit 3 is manually moved far from the left guiding wall 22 of the left guiding unit 2 and to a needed position, the actuating cap 65 will be pushed to slide on the right guiding wall 32. The sliding frame 61 is brought by the actuating cap 65 to slide toward and press the spring 62. Since, the positioning gearwheel 64 is brought to separate from the positioning linear gear 13.

Therefore, the right linear gear 31 of the right guiding unit 3 moved along the right guiding slot 12 brings the gearwheel 4 to rotate. The positioning gearwheel 64 rotates along the positioning linear gear 13. The rotation of the gearwheel 4 brings the left linear gear 21 to linearly move along the left guiding slot 11. Since, the left guiding wall 22 and the right guiding wall 32 are capable of synchronously sliding on the document supporting tray 1 far from each other.

After the right guiding wall 32 of the right guiding unit 3 is moved outwardly at the needed position, the actuating cap 65 is free. Since, the sliding frame 61 is pushed to slide toward the positioning linear gear 13 by the spring 62. The positioning gearwheel 64 is brought to engage with the positioning linear gear 13.

The single-way latch 63 latches the positioning gearwheel 64 for preventing the right guiding wall 32 from further sliding outwardly. Since, the right guiding wall 32 of the right guiding unit 3 and the left guiding wall 22 of the left guiding unit 2 can be kept at the needed position via the single-way latch 63 latching the positioning gearwheel 64.

As described above, the single-way latch means 6 can keep the right guiding wall 32 of the right guiding unit 3 and the left guiding wall 22 of the left guiding unit 2 at the suitable position for preventing the right guiding wall 32 and the left guiding wall 22 from further sliding outwardly. Therefore, the document guiding mechanism 100 has high reliability to resist shake and crash.

Furthermore, the present invention is not limited to the embodiments described above; diverse additions, alterations and the like may be made within the scope of the present invention by a person skilled in the art. For example, respective embodiments may be appropriately combined.

What is claimed is:

1. A document guiding mechanism comprising:
   a document supporting tray;
   a gearwheel coupled to the document supporting tray;
   a right guiding unit comprising
      a right guiding wall sliding on the document supporting tray; and
      a right linear gear extended from the right guiding wall and engaged with the gearwheel;
   a left guiding unit comprising
      a left guiding wall sliding on the document supporting tray and opposite to and parallel to the right guiding wall; and
      a left linear gear extended from the left guiding wall and engaged with the gearwheel; and
   a single-way latch means interconnected the document supporting tray and at least one of the right guiding unit and the left guiding unit;
   wherein the single-way latch means comprises
      a positioning linear gear formed at the document supporting tray;
      a positioning gearwheel coupled to one of the right guiding unit and the left guiding unit; and
      a single-way latch latching the positioning gearwheel.

2. The document guiding mechanism as claimed in claim 1, wherein
   one of the right guiding wall and the left guiding wall includes a receiving space formed therein, the single-way latch means comprises a sliding frame received in the receiving space, the positioning gearwheel coupled to the sliding frame; and a spring compressed between the sliding frame and one side surface of the receiving space.

3. The document guiding mechanism as claimed in claim 2, wherein the document supporting tray comprises a left guiding slot transversely formed at the document supporting tray;

a right guiding slot transversely formed at the document supporting tray and parallel to the left guiding slot; and a cavity formed at a central portion of the document supporting tray and between the left guiding a slot and the right guiding slot, the right linear gear is received in the right guiding slot, the left linear gear received in the left guiding slot.

4. The document guiding mechanism as claimed in claim 3, wherein the positioning linear gear is formed at one long side of one of the right guiding slot and the left guiding slot.

5. The document guiding mechanism as claimed in claim 4, wherein the left guiding wall and the left guiding wall are vertically positioned on the document supporting tray, extended direction of the right guiding wall and the left guiding wall is perpendicular to extended direction of the right guiding slot and the left guiding slot, the sliding frame slides in the receiving space along the extended direction of one of the right guiding wall and the left guiding wall, the spring is compressed between one end portion of the sliding frame and the surface of the receiving space, the positioning gearwheel couples to the other end portion of the sliding frame.

6. The document guiding mechanism as claimed in claim 5, wherein the sliding frame is formed a concave portion at one end portion thereof for receiving the spring.

7. The document guiding mechanism as claimed in claim 6, wherein the receiving space penetrates a top portion of one of the right guiding wall and the left guiding wall to form a top opening, the top opening is surrounded a track and covered by a actuating cap, the actuating cap connects to the sliding frame and includes a sliding path mating the track for sliding on the top portion along the extended direction of one of the right guiding wall and the left guiding wall.

8. A document guiding mechanism comprising:

a document supporting tray;

a right guiding unit sliding on the document supporting tray;

a left guiding unit sliding on the document supporting tray, the left guiding unit and the right guiding unit synchronously sliding to close to each other and synchronously sliding to far from each other; and a single-way latch means interconnected the document supporting tray and at least one of the right guiding unit and the left guiding unit for allowing the left guiding unit and the right guiding unit synchronously sliding to close to each other and preventing the left guiding unit and the right guiding unit synchronously sliding to far from each other when the single-way latch means latches at lest one of the left guiding unit and the right guiding unit;

wherein the single-way latch means comprises a positioning linear gear formed at the document supporting tray;

a positioning gearwheel coupled to one of the right guiding unit and the left guiding unit; and a single-way latch latching the positioning gearwheel.

9. The document guiding mechanism as claimed in claim 8, wherein the single-way latch means comprises a sliding frame received in one of the right guiding unit and the left guiding unit and coupled to the positioning gearwheel, and a spring received in one of the right guiding unit and the left guiding unit and compressed between the sliding frame and one of the right guiding unit and the left guiding unit for pressing the positioning gearwheel coupled to the sliding frame to engage with the positioning linear gear.

10. The document guiding mechanism as claimed in claim 9, wherein the single-way latch means comprises an actuator connected to the sliding frame and sliding on one of the right guiding unit and the left guiding unit for compressing the spring to release engagement of the positioning gearwheel and the positioning linear gear.

* * * * *